United States Patent [19]

Miyazaki

[11] Patent Number: 4,676,300
[45] Date of Patent: Jun. 30, 1987

[54] HEAT RADIATION CONTROL DEVICE
[75] Inventor: Yoshiro Miyazaki, Fuchū, Japan
[73] Assignee: Kabushiki Kaisha Toshiba, Kawasaki, Japan
[21] Appl. No.: 739,296
[22] Filed: May 30, 1985
[30] Foreign Application Priority Data
  Nov. 15, 1984 [JP] Japan .................. 59-240981
[51] Int. Cl.$^4$ ............. G05D 23/00; F28D 15/00
[52] U.S. Cl. .......................... 165/32; 165/41; 165/104.14
[58] Field of Search ............ 165/32, 41, 104.14
[56] References Cited
  U.S. PATENT DOCUMENTS

| | | | |
|---|---|---|---|
| 3,045,980 | 7/1962 | Isham | 165/32 HU |
| 3,390,717 | 7/1968 | Townsend | 165/1 |
| 3,463,224 | 8/1969 | Myers | 165/32 |
| 3,478,319 | 11/1969 | Reinke | 165/32 |
| 3,637,007 | 1/1972 | Schlosinger | 165/32 H |
| 4,000,776 | 1/1977 | Kroebig et al. | 165/32 HU |
| 4,273,183 | 6/1981 | Altoz et al. | 165/32 HU |
| 4,281,708 | 8/1981 | Wing et al. | 165/32 HU |
| 4,454,910 | 6/1984 | Miyazaki | 165/32 |

FOREIGN PATENT DOCUMENTS

| | | | |
|---|---|---|---|
| 3131685 | 3/1983 | Fed. Rep. of Germany | 165/32 |
| 57-203112 | 12/1982 | Japan | |
| 0076911 | 5/1983 | Japan | 165/32 |

OTHER PUBLICATIONS

Mechanical Engineering Article, Dec. 1984, "An Interview with Robert Haslett Space Station Thermal Control" by Tony Baer.
Astronautics & Aeronautics Article, Mar. 1983, "Heat Buses Will Operate Like a Public Utility" by W. E. Ellis and J. G. Rankin.

Primary Examiner—William R. Cline
Assistant Examiner—John K. Ford
Attorney, Agent, or Firm—Schwartz, Jeffery, Schwaab, Mack, Blumenthal & Evans

[57] ABSTRACT

A heat radiation control device in accordance with the present invention has a construction that includes a heat transmitting part which receives heat transfer from the heat source side, a freely expansible and contractible bellows case installed between the heat transmitting part and the frame, having a working fluid sealed in its interior, a heat receiving part on the radiator side arranged facing the heat transmitting part, to which the heat transmitting part is able to make contact by the elongation of the bellows case, and an energizing means for energizing the heat transmitting part at a position separated by a fixed distance with respect to the heat receiving part. According to the construction like in the above, since the bellows case expands and contracts under the temperature variations in the heat transmitting part that receives heat transfer from the heat source side, and the heat transmitting part contracts/recedes with respect to the heat receiving part on the radiator side, it is possible to control automatically the heat transfer from the heat source side to the radiator side in response to the temperature variations on the heat source side.

3 Claims, 14 Drawing Figures

HEAT RADIATION CONTROL DEVICE

BACKGROUND OF THE INVENTION

The present invention relates to a heat radiation control device which may be utilized in such a case as for radiating heat which is generated in the electrical instruments within an artificial satellite into the cosmic space outside of the artificial satellite.

DESCRIPTION OF THE PRIOR ART

Generally speaking, heat generated within a space craft such as artificial satellite or space station is released into the cosmic space by radiation. In such a case, when, for example, in the case of an artificial satellite with small amount of generated heat, it is possible to release the heat directly into the cosmic space through the panels on which the electrical instruments or the like are placed. However, in the case like a large-scale artificial satellite with large amount of generated heat, radiation through the panels on which are placed electrical instruments or the like may become impossible to deal with the situation. This leads to a rise in temperature inside of the panels, which gives rise to a possibility that a stable performance of the electrical instruments and the like may be jeopardized.

Because of this, for a space craft with large amount of generated heat, in order to improve the radiation efficiency there have been proposed methods in which there are installed special cooling surfaces for conducting generated heat from the heat source to the cooling surfaces by a heat transmitting system. As a heat transmitting system which conducts heat from the heat source to the cooling surfaces, there is generally employed a circulation system which utilizes a fluid as the heating medium. Such a fluid circulation system is sometimes made as a single loop construction. However, the cooling surfaces are exposed to the cosmic space and are liable to damages due to collisions with meteorites and others so that it is desirable to disperse the hazard. Further, temperature difference between the heat source side and the radiator side could become large so that it is desirable to employ different kinds of fluid for the heat source side and for the radiator side, from the viewpoint of freeze prevention, heat transmission efficiency, and others. For these reasons, it is general to divide the fluid circulation system into a construction with plurality of loops.

When the fluid circulation system has a construction which is divided into a plurality of loops as described in the above, it will be reliable for connecting the heat transmitting sections of each loop construction if they are bound with bolts or the like. However, the workability is poor in the case of carrying out assembling and maintenance in the cosmic space so that it is difficult to perform the bolt fastening or the like in the space.

Therefore, there has been proposed in the past a coupling device as will be described below.

The coupling device has a construction in which a diaphragm is arranged inside an outer pipe, an inner pipe is inserted at the central part of the diaphragm, and a pressurizing fluid is applied between the outer pipe and the diaphragm to create a passageway between the outer pipe and the inner pipe by fixing the inner pipe through bending of the diaphragm. Then, the coupling work in the cosmic space will become possible to be carried out with ease by the application of the above coupling device to the coupling of the plurality of the loops.

However, there will arise in this case a problem that a pressurizing equipment has to be installed for operating the pressurizing fluid.

On the other hand, when the electrical instruments and the like that act as the heat source are of large scale, the heat generation varies in a complicated manner with large variations in its heat output. When cooling of such a heat source is to be carried out with a fluid circulation system, the temperature on the heat source side may deviate from a proper temperature range unless the amount of heat transmitted by the fluid is controlled. Then, it becomes necessary to introduce a construction in which a bypass route with a valve is formed in the loop to control the valve in accordance with the temperature changes that take place on the heat source side. In this case, along with a possibility of having leakage of the working fluid from the valve section and others, which will reduce the reliability of the operation, it will give rise to a problem that the construction of the system becomes complicated.

SUMMARY OF THE INVENTION

An object of the present invention is to provide a heat radiation control device which is adapted for easily connecting the heat transmitting system on the heat source side and the heat transmitting system on the radiator side, that use fluids as the heating media.

Another object of the present invention is to provide a heat radiation control device which is adapted for easy assembling work, in the cosmic space, of the heat transmitting system.

Another object of the present invention is to provide a heat radiation control device with simple construction which is capable of automatically controlling the heat transmission from the heat source side to the radiator side.

Another object of the present invention is to provide a heat radiation control device which makes it possible to improve the heat transmission efficiency between the heat source side and the radiator side.

Briefly described, these and other objects of the present invention are accomplished by the provision of an improved heat radiation control device which includes a heat transmitting parts that receive heat transmission from the heat source side, a heat receiving parts that are installed on the radiator side for receiving heat from the heat transmitting parts, and freely expansible and contractible bellows cases that have a working fluid sealed inside of them. The heat receiving parts are arranged to be capable of contacting and receding from the heat transmitting parts, and the bellows case is arranged so as to establish a contract between the heat receiving parts and the heat transmitting parts in accordance with its expansion.

BRIEF DESCRIPTION OF THE DRAWING

These and other objects, features and advantages of the present invention will be more apparent from the following description of preferred embodiments, taken in conjunction with the accompanying drawings, in which.

DESCRIPTION OF THE PREFERRED EMBODIMENTS

Figure 1:
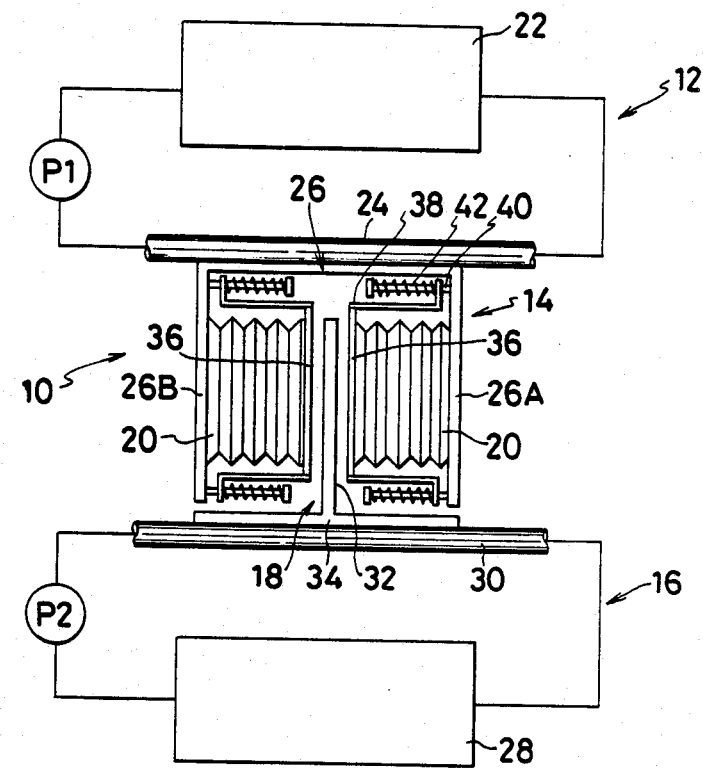
FIG. 1 is the front view of a first embodiment of the heat radiation control device in accordance with the present invention.

Referring to FIG. 1, there is shown a first embodiment of the heat radiation control device in accordance with the present invention with a reference numeral 10.

The heat radiation control device 10 is constructed with a heat transmitting section 14 installed on the heat source side 12, a heat receiving section 18 installed on the radiator side 16, and a pair of freely expansible and contractible bellows cases 20 that are installed on the heat transmitting section 14.

The heat source side 12 consists of a primary piping 24 and others that are connected to a heat source 22 of the space craft, and inside the primary piping 24 there is circulated by a pump P1 an appropriate fluid as a heating medium. In the primary piping 24 there is installed the heat transmitting section 14 that was described in the above. As the heat transmitting section 14, there is installed in this embodiment an approximately U-shaped base board 26 which is equipped with platelike heat transmitting parts 26A and 26B that are placed facing to each other. The base board 26 is fixed solidly to the primary piping 24 by an appropriate fixing means such as welding or bolts.

The radiator side 16 consists of a secondary piping 30 and others that are connected to a suitably constructed radiating board 28. In the secondary piping 30 there is circulated an appropriate fluid by means of a pump P2, and the heat receiving section 18 is installed on the secondary piping 30. As the heat receiving section 18, there is installed in this embodiment a T-shaped base board 34 having in one united body a platelike heat receiving part 32 which is arranged in-between the heat transmitting parts 26A and 26B that are facing to each other. The base board 34 is mounted solidly on the secondary piping 30 by means of an appropriate fixing means.

A pair of bellows cases 20 have an appropriate working fluid sealed in them, and expand due to thermal expansion of the working fluid or to a rise in the internal vapor pressure. The bases of the bellows cases 20 are fixed to the heat transmitting parts 26A and 26B respectively. On the free ends of each of the bellows cases 20 are attached platelike contacting/receding parts 36 that can freely contact or recede relative to the heat receiving part 32. Brackets 38 are installed at several appropriate places of these contacting/receding parts 36, and there are elastically installed appropriate spring devices 42 such as coil springs, that act to contract the bellows cases 20 for all times, between the brackets 38 and the guide rods 40 that are fixed to the heat transmitting parts 26A and 26B.

In addition, though a detailed figure is omitted, there is arranged in the bellows cases 20 an appropriate means for effectively conducting heat from the heat transmitting parts 26A and 26B to the contacting/receding parts 36. Namely, it is possible to give it a variety of constructions, for example, to give it a construction that has a plurality of heat conducting plates that make mutual surface-contact in a freely sliding manner with the base sides of the bellows cases 20 and the contacting/receding parts 36, or to convert the inside of the bellows cases 20 to heat pipes.

When, in a construction like in the above, a liquid is circulated as the heating medium between the heat source 22 and the primary piping 24 by the action of the pump P1, the heat in the heat source 22 is transferred to the fluid, cooling the heat source 22. The heat in the fluid is transferred from the primary piping 24 to the heat transmitting parts 26A and 26B of the base board 26 in the heat transmitting section 14. Therefore, the working fluid in the bellows case 20 is heated, the vapor pressure inside the bellows case 20 increases gradually, and the bellows case 20 is elogated against the spring device 42. In this case, the position of the contacting/receding parts 36 is determined by the condition under which the vapor pressure inside the bellows case 20 and the stored energy of the spring device 42 balance to each other.

When the contacting/receding parts 36 make contact with the heat receiving part 32 of the heat receiving section 18 due to expansion of the bellows case 20, heat is transferred from the heat transmitting section 14 to the heat receiving section 18, heating the base board 34 of the heat receiving section 18 and the secondary piping 30. Therefore, heat is transferred to the fluid which is circulated in the radiating board 28 and the secondary piping 30 under the action of the pump P2, and radiation of heat into the cosmic space is accomplished at the radiating board 28.

As the temperature is lowered due to the heat transfer like in the above and the heat radiation at the radiating board 28, the vapor pressure inside the bellows case 20 decreases and the bellows case contracts under the action of the spring device 42. Therefore, the contacting/receding parts 36 recede from the heat receiving part 32 of the heat receiving section 18, interrupting the transfer of heat from the heat source side 12 to the radiator side 16. Then, by such an arrangement, the overcooling of the heat source side 12 is prevented, maintaining it at an optimum temperature range for all times.

In the present embodiment it is only required to place a heat receiving part 32 that is prepared on the radiator side 16 in-between the free ends of a pair of bellows cases 20 that are installed on the heat source side 12, so that the construction of the system becomes simple and the workability in the cosmic space is improved.

Figure 2:
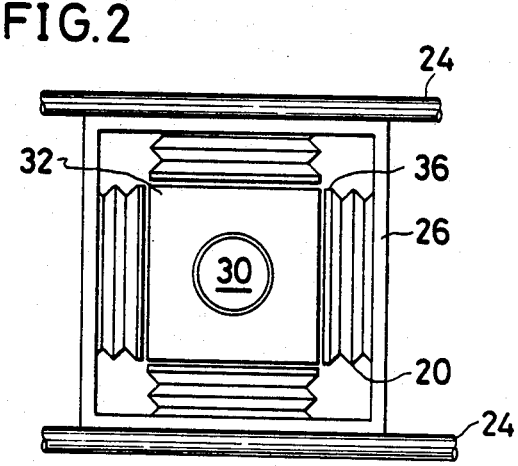
FIG. 2 is the front view of a first modification to the heat radiation control device as shown by FIG. 1.

In FIG. 2, there is shown a first modification to the heat radiation control device shown in FIG. 1. In this modification, the base board 26 on the heat source side 12 is formed into a rectangular frame, and the primary pipings 24 are arranged on a pair of mutually facing sides of the base board 26. At the central part of the base board 26 there is arranged the secondary piping 30 in the direction perpendicular to the primary pipings 24, and a rectangular heat receiving part 32 is attached to the secondary piping 30. At four places on the inner surface of the base board 26 these are attached bellows cases 20 with their contacting/receding parts 36 facing the heat receiving part 32.

Figure 3:
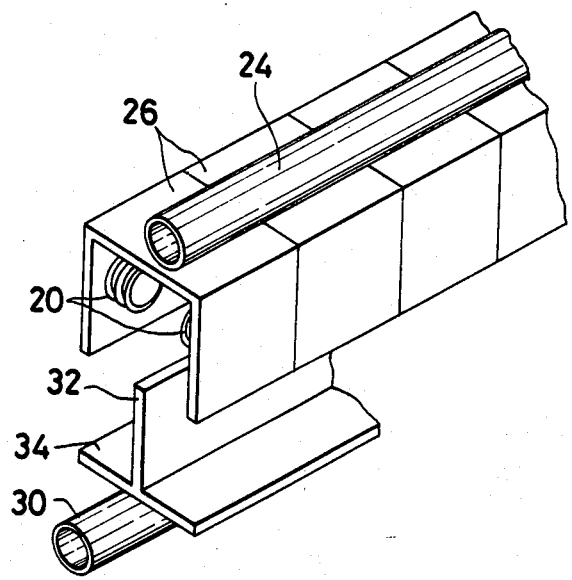
FIG. 3 is a perspective view of a second modification to the heat radiation control device as shown by FIG. 1.

In FIG. 3 is shown a second modification to the heat radiation control device as shown by FIG. 1. Here, the mode of operation of the bellows case 20 is to expand and contract in the direction perpendicular to the longitudinal direction of the primary piping 24, and it shows a construction in which a plurality of base boards 26 are arranged in the longitudinal direction of the primary piping 24. By arranging a plurality of base boards 26 in this manner, it becomes possible to deal with the case in which the amount of heat generated at the heat source is large.

Figure 4:
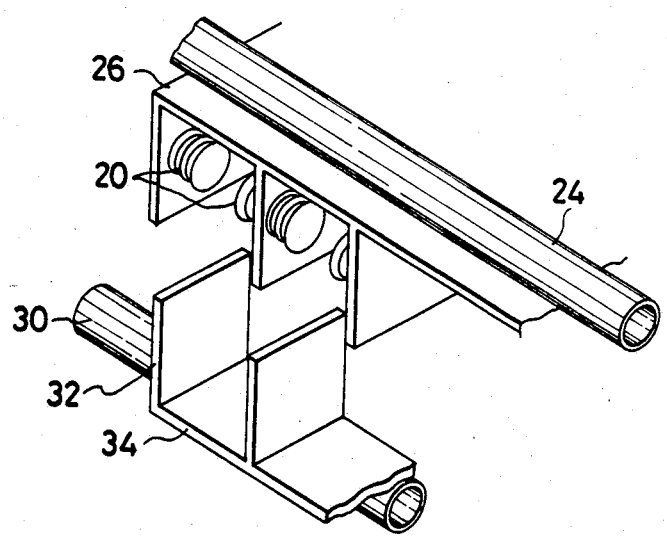
FIG. 4 is a perspective view of a third modification to the heat radiation control device as shown by FIG. 1.

In FIG. 4 is shown a third modification to the heat radiation control device as shown by FIG. 1. The mode of expansion and contraction of the bellows cases 20 is in the longitudinal direction of the primary piping 24, and it shows a construction in which the base board 26 is extended in the longitudinal direction of the primary piping 24.

Figure 5:
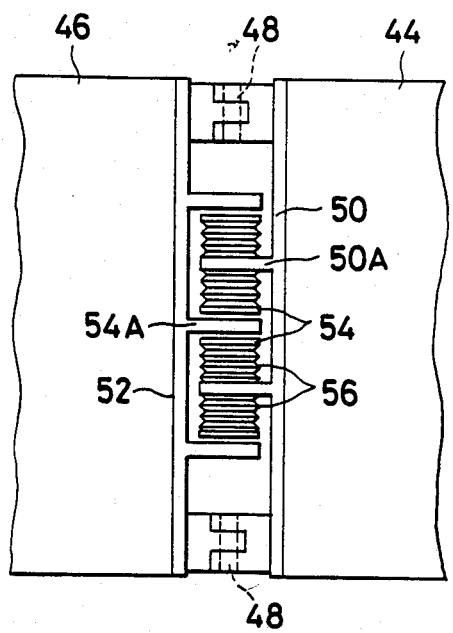
FIG. 5 is the front view of a fourth modification to the heat radiation control device as shown by FIG. 1.

In FIG. 5 is shown a fourth modification to the heat radiation control device as shown by FIG. 1. It shows an example of arranging a radiating panel 46 by means of hinge pins 48 as freely expansible with respect to the main frame panel 44 on the heat source side 12. In this embodiment, the heat transmitting parts 50A of the base board 50 that is set on the main frame panel 44 and the heat receiving parts 52A of the base board 52 that is set on the radiating panel 46 are arranged alternately, and on both sides of the heat conducting part 50A there are mounted freely expansible and contractible bellows cases 56 that have contacting/receding parts 54. The axis line of the bellows cases 56 coincides approximately with the axis line of the hinge pins 48.

Accordingly, in this modification, regardless of the angle of expansion of the radiating panel 46 with respect to the main frame panel 44, the contacting/receding parts 54 of the bellows cases 56 and the heat receiving parts 52A of the base board 52 find themselves in the state of facing to each other for all times. Therefore, even if the expansion of the radiating panel 46 is insufficient, it is possible to carry out positively transfer of heat from the side of main frame panel 44 to the side of radiating panel 46.

Figure 6:
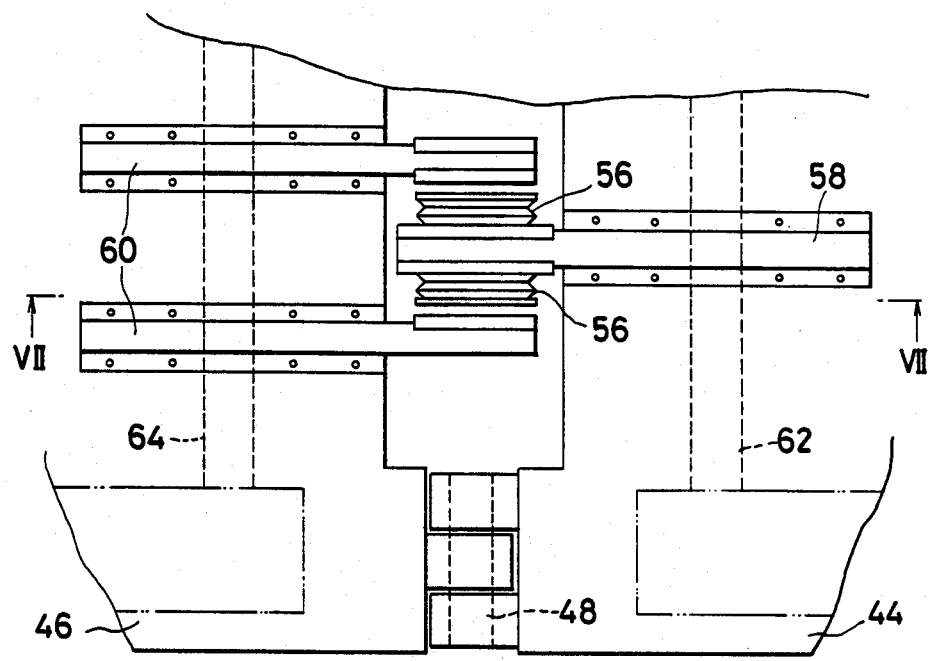
FIG. 6 is the front view of a fifth modification to the heat radiation control device as shown by FIG. 1.
Figure 7:
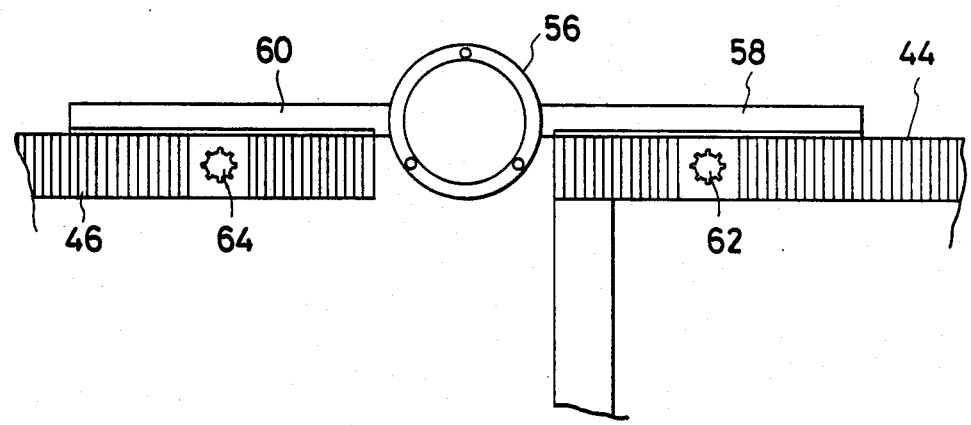
FIG. 7 is the crosssectional view along the VII—VII line of FIG. 6.

In FIG. 6 and FIG. 7 there is shown a fifth modification to the heat radiation control device as shown by FIG. 1. The modification shows an example in which both of the main frame panel 44 and the radiating panel 46 are arranged to have honeycomb structure, and the heat transmitting part 58 and the heat receiving part 60 that share the bellows cases 56 are made to be heat pipes. In this modification, a relay heat pipe 62 which is connected to the heat source in an appropriate manner is installed on the main frame panel 44 to improve the efficiency of heat transfer from the heat source to the heat transmitting part 58. In addition, a heat pipe 64 for diffusing the heat from the heat receiving part 60 is installed on the radiating panel 46 to improve the efficiency of heat radiation. Similar effects as in the previous embodiments can also be expected for this modification.

Figure 8:
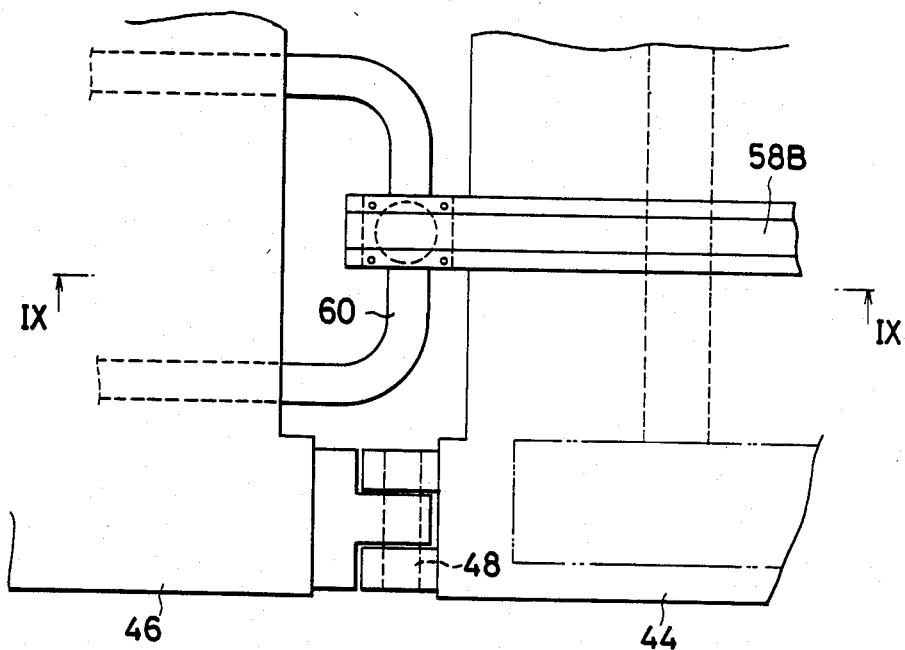
FIG. 8 is the front view of a sixth modification to the heat radiation control device as shown by FIG. 1.
Figure 9:
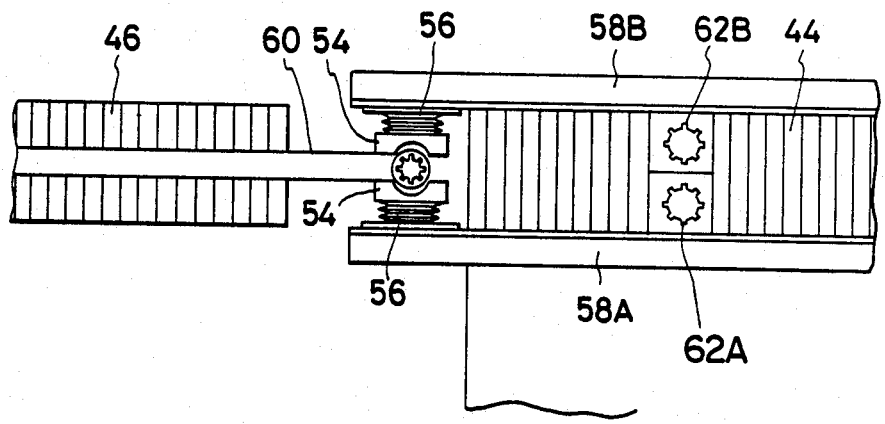
FIG. 9 is the crosssectional view along the IX—IX line of FIG. 8.

In FIG. 8 and FIG. 9 is shown a sixth modification. According to this modification, heat transmitting parts 58A and 58B consisting of heat pipes are arranged on both of the inner and outer sides of the main frame panel 44, and relay heat pipes 62A and 62B are also arranged doubly within the main frame panel 44. On the other hand, the heat receiving part 60 consisting of a heat pipe and is being installed in the radiating panel 46 is bent roughly in the shape of letter U, and the axis line of the part of the heat receiving part 60 that is intruding in-between the heat transmitting parts 58A and 58B of the heat receiving part 60 coincides with the axis line of the hinge pins 48. The portion of the contracting/receding components 54 of the bellows cases 56 that are mounted on the heat transmitting parts 58A and 58B make contact with the heat receiving component 60 is formed to have a shape that corresponds to the exterior shape of the heat receiving part 60 (in this modification, it has the shape of a circular arc).

In this modification, too, it is possible to accomplish similar effects that will be obtained for the embodiments described in the foregoing.

Figure 10:
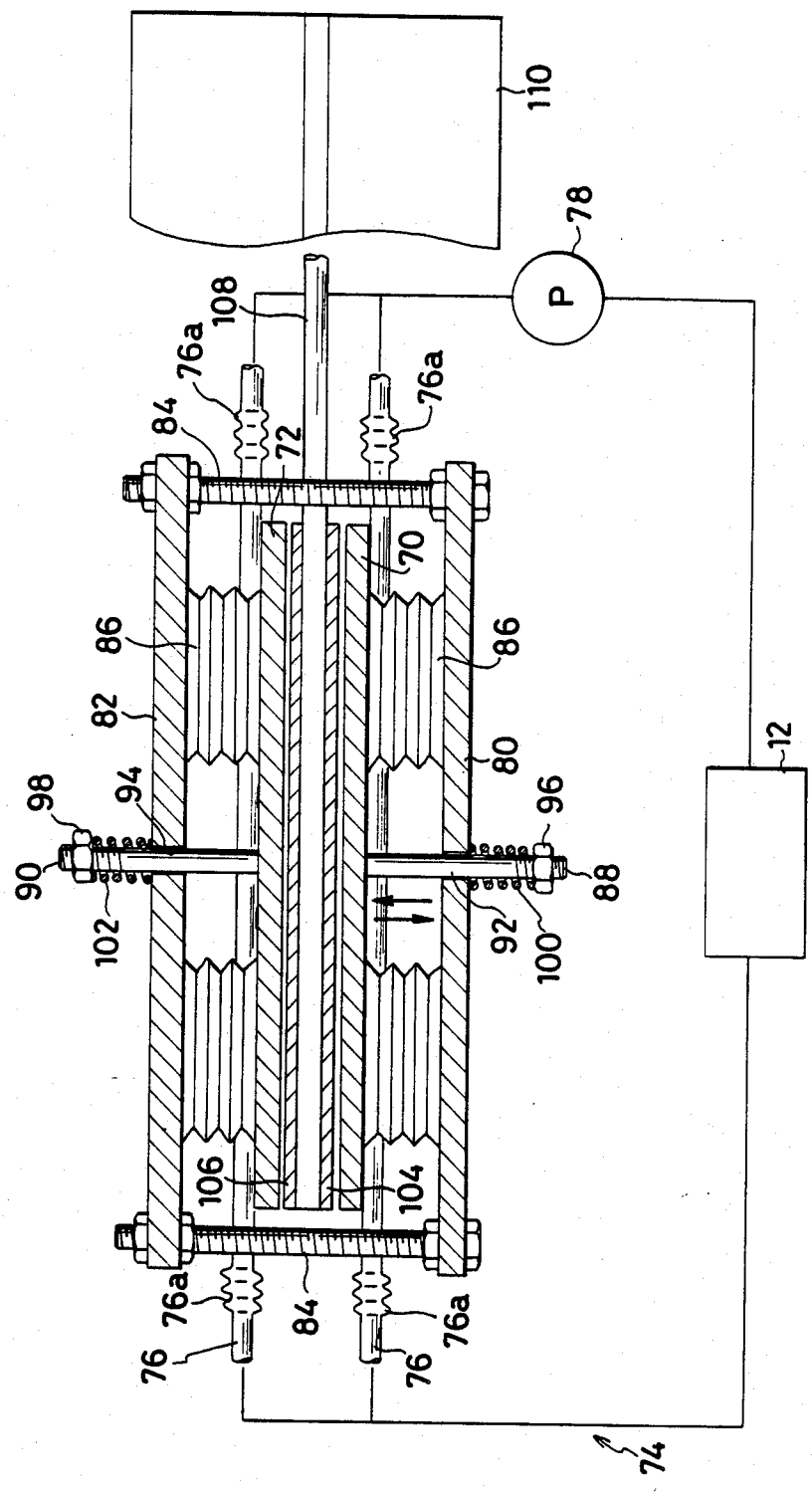
FIG. 10 is the front view of a second embodiment of the heat radiation control device in accordance with the present invention.

In FIG. 10 there is shown a second embodiment of the present invention. In this embodiment, on a pair of heat transmitting parts 70 and 72 that are arranged facing to each other, there are fixed, by welding or other method, pipings 76 that constitute the fluid circulation system 74 on the heat source side 12. The heat source 22 consists of electrical instruments and the like that are installed in the interior of the artificial satellite. On the pipings 76 there are provided flexible pipes 76A to accommodate the bending of the pipings. In the fluid circulation system 74 there is inserted a pump 78 for circulating the fluid within the system. That is, the heat transmitting parts 70 and 72 are constructed so as to receive the heat transferred from the heat source side 12.

On the outside of the heat transmitting parts 70 and 72 there are arranged frames 80 and 82 that are facing to each other, and the frames 80 and 82 are joined mutually by means of a plurality of stud bolts 84. Between the heat transmitting parts 70, 72 and the frames 80, 82 there are inserted a plurality of bellows cases 86, one end of each of the bellows cases 86 is fixed to the heat transmitting parts 70 and 72, while the other end of each of the bellows cases 86 is fixed similarly to the frames 80 and 82. Within the bellows cases 86 these is sealed a working fluid.

One end of each of the shafts 88 and 90 is fixed to the heat tramsmitting parts 70 and 72 at about their respective centers, and the other end of each of the shafts 88 and 90 is pierced through each of the through holes 92 and 94 to extend outward in the state of floating insertion. At the end portions of the shafts 88 and 90 that are extending outward, there are screwed on nuts 96 and 98, and between the nuts 96, 98 and the frames 80, 82 there are inserted coil springs 100 and 102 that constitute an energizing means. Therefore, the coil springs 100 and 102 are constructed so as to energize the heat transmitting parts 70 and 72 at a position separated by a fixed distance with respect to the heat receiving parts that will be described later.

On the other hand, between the heat transmitting parts 70 and 72, there are arranged the heat receiving parts 104 and 106 of the radiator side, facing to each other with a fixed separation. Between the heat receiving parts 104 and 106 there is fixed one end of each of a plurality of heat pipes 108 (only one of them is shown in the figure). The other end of each of these heat pipes 108 is extended outward into the cosmic space outside of the artificial satellite or the like, and is fixed to the radiating panel 110. Here, when the heat receiving parts 104 and 106 are moveably arranged between the two heat transmitting parts 70 and 72, the heat receiving parts are supported by a clamping member (not shown) mounted on the frames 80 and 82. Further, the heat receiving parts 104 and 106 are moved to and fro by the aid of limit switches also arranged on the frame side.

Next, the operation of the second embodiment will be described.

First, the fluid begins to circulate in the fluid circulation system 74 by the operation of the pump 78. As the fluid is circulated, heat is taken away from the heat source 22 such as the electrical instruments, and the fluid arrives at the piping 76 on the side of the heat transmitting parts in a heated state. On the side of the heat transmitting parts 70 and 72, heat is transferred directly from the fluid in the heated state to the heat transmitting parts 70 and 72. In this case, heat transfer from the fluid to the heat transmitting parts 70 and 72 is carried out only by the intermediary of the surface of contact between the piping 76 and the heat transmitting parts 70 and 72, so that the contact resistance may be reduced and the efficiency of heat transfer may be improved.

The working medium inside the bellows cases 86 is heated and evaporated by the heat that is transferred through the heat transmitting parts 70 and 72. Therefore, the pressure within the bellows cases 86 goes up, and when the pressure overcomes the energizing force of the coil springs 100 and 102, the heat transmitting parts 70 and 72 come into contact with the heat receiving parts 104 and 106 by the elongation of the bellows cases 86. In this case, the piping 76 can be bent at the portions of the flexible pipes 76a. With the contact between the heat transmitting parts 70, 72 and the heat receiving parts 104, 106, heat at the heat transmitting parts 70 and 72 is transferred to the heat receiving parts 104 and 106. The heat transferred to the heat receiving parts 104 and 106 arrives at the radiating panel 110 via the heat pipe 108, and is radiated into the cosmic space from the radiating panel 110.

With repetition of radiation taking place in this fashion, the heat source 22 is cooled with its temperature going down. As the temperature of the heat source 22 is lowered, the heat transferred from the fluid which is circulating in the circulation system 74 to the heat transmitting parts 70 and 72 is reduced, and the working medium in the bellows cases 86 begins to condense. Therefore, the pressure inside the bellows cases 86 goes down, the energizing force of the coil springs 100 and 102 overcomes the pressure, and the heat transmitting parts 70 and 72 are energized at a position separated by a fixed distance with respect to heat receiving parts 104 and 106. With repeated contact and recession of the heat transmitting parts 70 and 72 with respect to the heat receiving parts 104 and 106, radiation from the heat source 22, is controlled, maintaining a temperature suitable for the operation of the electrical instruments and others as the heat source 22.

In addition, the heat of the fluid in the circulation system 74 is transferred directly to the heat transmitting parts 70 and 72 without intermediary of the bellows cases 86, so that it is not necessary to give a heat-pipe construction to the interior of the bellows cases 86, simplifying the construction of the system. Even when the heat pipe 108 on the radiator side is given a plurality construction, it is not necessary to join each components to the heat source side 12 with bolts or the like, and it is possible to arrange the pipe 108, together with the heat receiving parts 104 and 106, in the area between the frames 80 and 82 on the heat source side 12, in a single-touch operation, permitting the assembly work to be extremely simple. Moreover, for fixing the heat pipe 108, it is not necessary to have a separate pressurizing apparatus and others which are required in the case of the prior art device that utilizes diaphragms.

Figure 11:
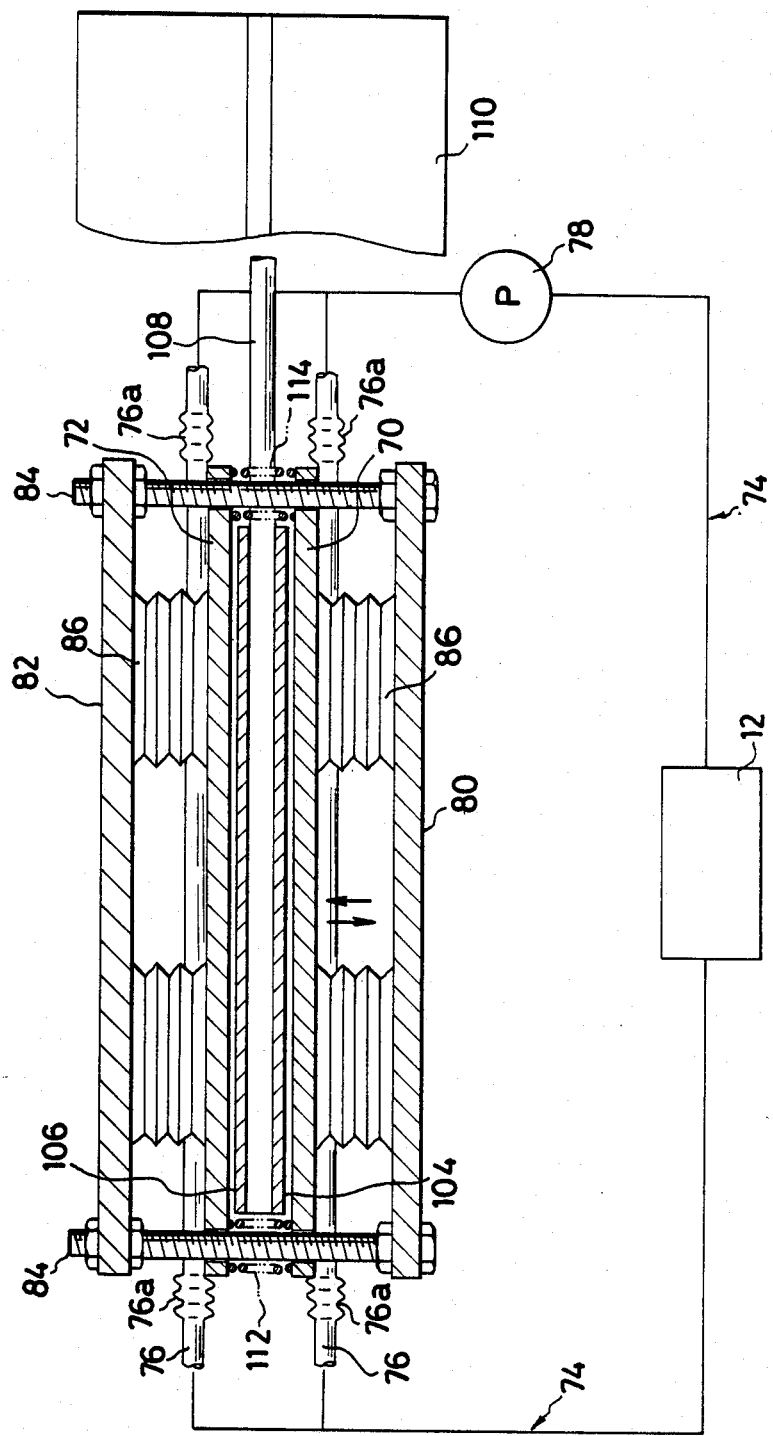
FIG. 11 is the front view of a first modification to the heat radiation control device as shown by FIG. 10.

In FIG. 11 there is shown a first modification to the heat radiation control device shown by FIG. 10. In this first modification, the coil springs 112 and 114 that constitute an energizing means are arranged between the two heat transmitting parts 70 and 72 by the use of stud bolts 84. Therefore, it is possible in this modification to aim at a compactification of the system around the frames 80 and 82.

Figure 12:
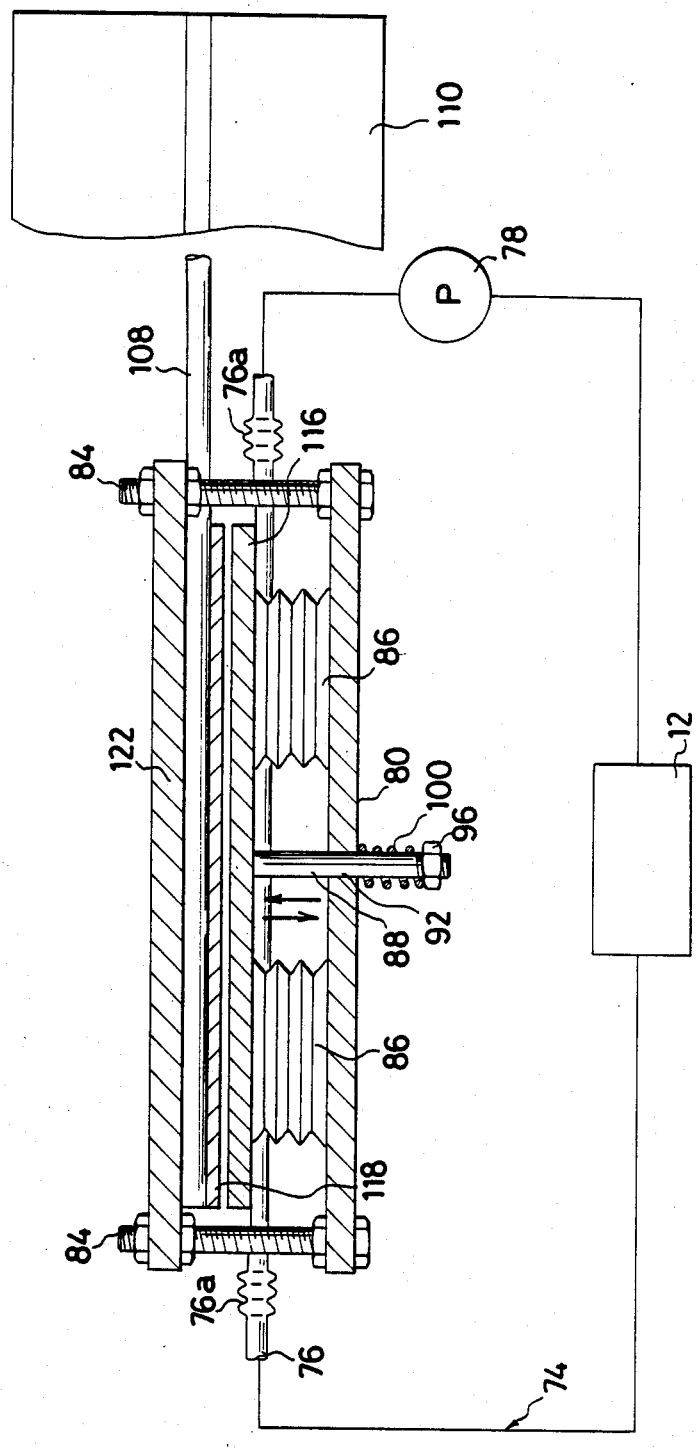
FIG. 12 is the front view of a second modification to the heat radiation device as shown by FIG. 10.

In FIG. 12 there is shown a second modification to the heat radiation control device as shown by FIG. 10. The second embodiment has a construction in which a heat transmitting part 116 and a heat receiving part 118 are each given a single structure, where the heat receiving part 118 side is fixed to the frame 112 side in a manner similar to the first embodiment. It is desirable to construct the frame 112 by the use of a heat insulating material.

Figure 13:
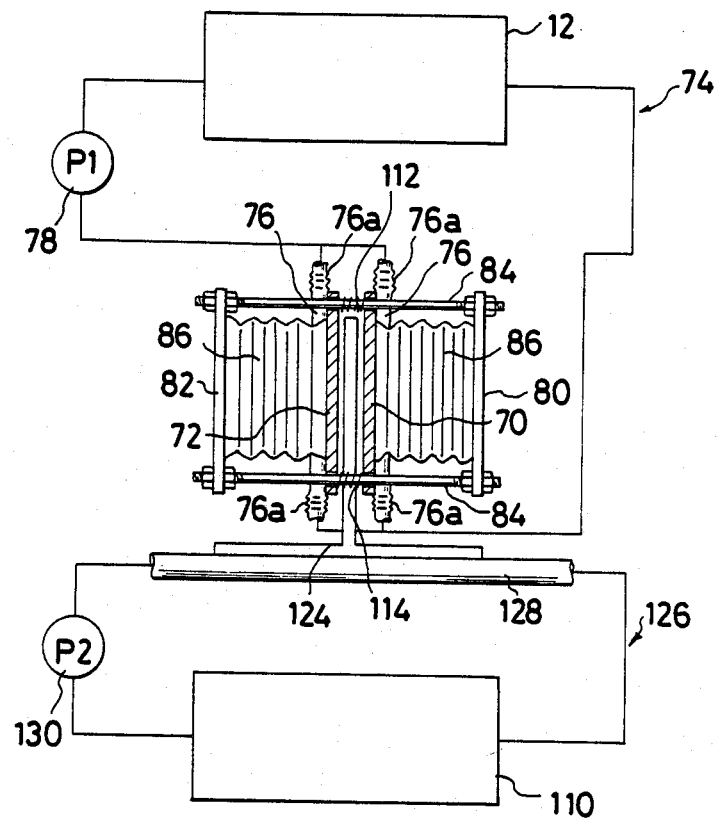
FIG. 13 is the front view of a third modification to the heat radiation control device as shown by FIG. 10.

FIG. 13 concerns a third modification to the heat radiation control device as shown by FIG. 10, which is similar to the first modification. The heat receiving part 124 on the radiator side is inserted between the heat transmitting parts 70 and 72 on the heat source side 12, to form the shape of a T, and the heat receiving part 124 is fixed by welding or other method to the piping 128 on the radiator side which constitutes a part of the fluid circulation system 126 on the radiator side. A pump 130 is provided in the fluid circulation system 126 on the radiator side.

Figure 14:
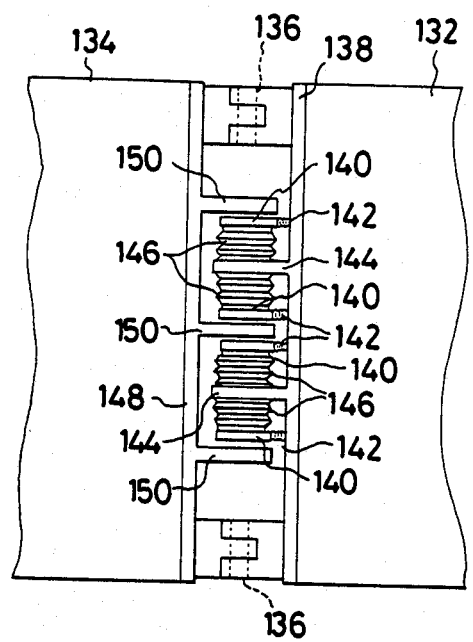
FIG. 14 is the front view of a fourth modification to the heat radiation control device as shown by FIG. 10.

FIG. 14 concerns a fourth modification to the heat radiation control device as shown by FIG. 10 which shows the case where the radiating panel 134 on the radiator side is interlocked by means of hinge pins 136 as freely expansible with respect to the main frame panel 132 on the heat source side. In the fourth modification, on the base board 138 attached to the main frame panel 132, there are attached heat transmitting parts 140 via flexible parts 142, and also there are provided frame parts 144 that are formed in a united body with the base board 138. Between the heat transmitting parts 140 and the frame parts 144 there are inserted bellows cases 146 that are arranged coaxially with the hinge pins 136. The bellows cases 146 possess their own elastic force in the direction of their expansion and contraction. On the other hand, on the base board 148 on the radiation panel 134, there are provided heat receiving parts 150 incorporated in the base board 148, facing the heat transmitting parts 140.

Accordingly, in this modification, the heat transmitting parts 140 and the heat receiving parts 150 find themselves in the state of facing to each other for all times, without regard to the angle of expansion of the radiating panel 134 with respect to the main frame panel 132. Because of this, it is possible to carry out without failure the transfer and interruption of heat from the side of the main frame panel 132 to the side of the radiating panel 134, even for the case when the expansion of the radiating panel is insufficient. In addition, the joining of the main frame panel 132 and the radiating panel 134 by means of the hinges 136 may be carried out either on the ground in advance or in the cosmic space. Even in the latter case, the work required is an extremely simple one since it is a joining work by the use of the hinge pins 136.

It should be noted that the components in the first and second modifications that are approximately similar to those in the second embodiment shown in FIG. 10, or the parts in the third modification, that are approximately similar to those in the first modification were shown with the same signs to omit further explanation. Furthermore, the present invention is not limited to the embodiment described in the foregoing. Thus, for example, the frames 80 and 82 or the frame 122 may be covered with a heat insulating material to improve further the controllability by preventing the leakage of heat into the surroundings. Both ends of the bellows case may be arranged to be merely placed between the frame and the heat transmitting part, without fixing them. Also, it may be arranged to have one end of the bellows case fixed to the frame or the heat transmitting part. In this case, the other end of the bellows case may be inserted to a cavity formed in the frame or the heat transmitting part.

What is claimed is:

1. A heat radiation control device for controlling heat transfer from a heat source to a heat radiator, which comprises:
   (a) a pair of flat frames arranged in parallel spaced relation to each other;
   (b) a pair of means for transmitting heat generated from the heat source, said heat transmitting means being supported in symmetrical relation to each other within a space formed between said two flat frames and connected to the heat source through a fluid circulation system connected to the heat source;
   (c) a pair of means for receiving heat transmitted from said heat transmitting means, said heat receiving means being disposed between said two heat transmitting means for transmitting received heat to a heat radiator; and
   (d) means, comprising two pairs of expansible and contractible bellows having a working fluid therewithin, one pair of said bellows means being retained on each of opposing inner sides of said flat frames and being in contact wtih each of said heat transmitting means, for bringing said heat transmitting means into contact with said heat receiving means when said bellows are expanded due to a high temperature of said working fluid, and for separating said heat transmitting means out of contact from said heat receiving means when said bellows means are contracted due to a low temperature of said working fluid.

2. A heat radiation control device as claimed in claim 1, which further compries a pair of springs for urging said heat transmitting means away from said heat receiving means when said working fluid is at a low temperature.

3. A heat radiation control device as claimed in claim 1, which further comprises a pair of flexible pipes each connected to one of said heat transmitting means, for absorbing the bending motion when said movable heat transmitting means is moved, and for circulating fluid in the fluid circulation system for heat transfer.

* * * * *